US006594395B1

(12) United States Patent
Forchheimer et al.

(10) Patent No.: US 6,594,395 B1
(45) Date of Patent: Jul. 15, 2003

(54) REAL-TIME MOBILE VIDEO COMMUNICATION WITH LOW POWER TERMINALS

(75) Inventors: Robert Forchheimer, Linköping (SE); Haibo Li, Linköping (SE)

(73) Assignee: Forskarpatent I Linkoping, AB (SE)

( * ) Notice: Subject to any disclaimer, the term of this patent is extended or adjusted under 35 U.S.C. 154(b) by 0 days.

(21) Appl. No.: 09/254,081

(22) PCT Filed: Jan. 12, 1998

(86) PCT No.: PCT/SE98/00030

§ 371 (c)(1),
(2), (4) Date: May 13, 1999

(87) PCT Pub. No.: WO99/02003

PCT Pub. Date: Jan. 14, 1999

(30) Foreign Application Priority Data

Jul. 2, 1997 (SE) ................................................. 9702544

(51) Int. Cl.[7] .............................. G06K 9/36; G06K 9/46
(52) U.S. Cl. ................... 382/236; 375/240.12; 382/238
(58) Field of Search ................................. 382/232, 233, 382/236, 238; 358/261.2, 430; 348/699; 375/240.12, 240.16

(56) References Cited

U.S. PATENT DOCUMENTS

| 4,703,350 A | | 10/1987 | Hinman ....................... 358/133 |
| 4,965,666 A | * | 10/1990 | Haghiri ....................... 348/699 |
| 5,305,400 A | * | 4/1994 | Butera ......................... 382/107 |
| 5,481,553 A | * | 1/1996 | Suzuki et al. ........... 375/240.16 |
| 5,550,756 A | | 8/1996 | Ohmi et al. .............. 364/514 R |
| 5,592,469 A | * | 1/1997 | Szabo ......................... 370/342 |
| 6,108,378 A | * | 8/2000 | Keesen .................. 375/240.16 |

FOREIGN PATENT DOCUMENTS

GB 2222338 2/1990 ............ H04N/7/12

OTHER PUBLICATIONS

Rabiner, "Network–Driven Motion Estimation for Wireless Video Terminals", IEEE Transaction on Circuits and Systems for Video Technology, vol. 7 No. 4 Aug. 1997, p. 644.

* cited by examiner

Primary Examiner—Timothy M. Johnson
(74) Attorney, Agent, or Firm—Hayes Soloway P.C.

(57) ABSTRACT

Methods and networks are provided for enabling live video communication by performing image analysis and motion prediction outside the transmitter/encoder, i.e., either in the receiver or in a separate unit. In one aspect, a method for the transferring of moving pictures from a sending station to a receiving station comprises: obtaining, at the receiving station, a predicted picture frame through at least one motion compensation technique; comparing, at the receiving station, the predicted picture frame with the actual picture frame corresponding thereto; generating, at the receiving station, a deviation signal corresponding to the difference between the actual and the predicted frames; transmitting the deviation signal to the sending station; and respectively updating a data model contained in each of the sending and receiving stations, based on the deviation signal.

8 Claims, 4 Drawing Sheets

REAL-TIME MOBILE VIDEO COMMUNICATION WITH LOW POWER TERMINALS

BACKGROUND OF THE INVENTION

1. Field of the Invention

Mobile communications is currently one of the fastest growing markets and is expected to continue to expand. Today the functionalities of mobile communications are quite limited. Only speech or data can be handled. It is expected that image information, especially real-time video information, will greatly add to the value of mobile communications. Low cost mobile video transmission is highly sought for many practical applications, e.g., mobile visual communications, live TV news reports, mobile surveillance, telemedicine, viral reality, computer games, personal travel assistance, underwater visual communications, space communications, etc. However, there are indeed numerous difficulties encountered with the inclusion of live video information into mobile communications. Different from speech information, video information normally needs greater bandwidth and processing performance. In contrast, the mobile terminals of today suffer from certain limitations, e.g., (1) mobile terminals usually have limited power, typical transmission output power levels, 10 microwatts-1 watt; and (2) the terminals have limited capability to wirelessly transmit data 1 kb/s–10 kb/s. Based on these facts, real-time mobile video transmission can only be achieved when a highly efficient compression algorithm with a very low implementation complexity can be implemented.

2. Description of the Prior Art

To compress motion pictures, a simple solution is to compress the picture on a frame-by-frame basis, for example, by means of the JPEG algorithm. This will result in a rather high bit rate although at low complexity. To achieve high compression efficiency, advanced video compression algorithms are needed. Up to now, different types of video compression algorithms have been developed. Typical examples include H.263-type block-based, 3D model-based, and segmentation based coding algorithms. Although based on different coding principles, these algorithms adopt a similar coding structure, namely a closed-loop coding structure. Such a unified coding structure is shown in FIG. 1. In this structure, the important blocks are image analysis, image synthesis, spatial encoder/decoder and modeling. Video compression algorithms are different in the image analysis and synthesis parts. Amongst the blocks, the most power consuming one is image analysis. The following are typical image analysis tasks performed by different algorithms:

H.263 coding algorithm. The main function of the image analysis part in the H.263 algorithm is to perform motion estimation. For motion estimation, commonly a block matching scheme is used. Unfortunately, motion estimation is very time- and power-consuming, although the motion model shown is very simple. For example, if a simple correlation measure is used, the sum of the absolute value of differences (SAD) is computed. For a full search over a +−7 displacement range at QCIF (176×144 pixels) resolution and 10 frames/s, the SAD computation would have to be performed over 57 million times each second. With increased search range and a finer resolution of motion vectors, computation performance will be greatly increased.

Model-based coding algorithm. The task of image analysis here is to extract animation parameters based on models. The models can be given a priori or can be built during coding processing. Since the animation parameters are related to 3-dimensional information, e.g., 3D motion and shape are observable as 2d image information, a good strategy is needed. A powerful tool based on the analysis by synthesis principle (ABS) is shown in FIG. 2. Obviously, this is the second closed-loop appearing in the encoder. The purpose of using this loop is to aid or verify image analysis. This is done by means of comparing the image synthesis block with the reference image. As can be seen, image analysis is rather complicated. In contrast, image synthesis is much simpler. In addition, in the beginning of the session, the analysis part needs to perform initial computations, such as object location or identification, feature points localization, the fitting of a generic model to the specific object appearing in the scenes, and initial pose estimation. This type of work also gives rise to a very heavy computational load.

Segmentation-based coding algorithm. The task of image analysis here is to segment images into objects according to an assumed definition, to track the objects and to estimate their motion or shape parameters. The commonly used models are 2D planar objects with affine motion, and flexible 3D objects with 3D motion. Obviously, the estimation of the motion and shape parameters associated with these models requires sophisticated operations. In addition, another complex task carried out by the image analysis is to maintain, update and choose the models.

In summary, three important observations about the involvement of image analysis in advanced video compression algorithms are that: (1) the complexity of the encoder is much greater than that of the decoder; (2) computational loads in the beginning are usually heavier than that during the coding process, requiring that the encoder have a strong peak computational ability; and (3) the decoder must operate exactly as the encoder does, that is, the decoder is passively controlled by the encoder. These points make advanced video algorithms difficult to implement in low power terminals to achieve live video communication.

SUMMARY OF THE INVENTION

To overcome these problems, this invention makes it possible to achieve video communication with very low power terminals using video compression algorithms with the following features: (1) low complexity of the encoder and decoder; (2) high compression efficiency; and, (3) remote control of the operation of the encoder. This invention will make it possible to use current or future video compression algorithms to achieve video communication with low power terminals. Another object of this invention is to move the image analysis part to the receiver or an intermediate point in the network. This is illustrated in FIG. 3. In this invention, we distinguish two different concepts: the transmitter/receiver and encoder/decoder, which are mixed together in conventional video communication systems. In this invention, the encoder does not necessarily sit in the transmitter. Instead, a main part of the encoder remains in the transmitter while the computation consuming part, image analysis, is put in the receiver. In this way, image analysis is performed in the receiver instead of the transmitter. The generated animation and model data are then sent back to the transmitter to run normal encoding processing. Therefore, the encoder is still a virtually complete system but physically is distributed across both the transmitter and receiver. It is understood that to enable such communication the receiver must have sufficient power to perform complex image analysis, and the latency between the receiver and transmitter should be low. Alternatively, low latency may not be necessary if model-based or object-oriented coding schemes are used. The key is having sufficient power. For example, a high performance computer or server can be used to communicate with these low power terminals. In principle, this invention enables a supercomputer performance at a very low cost.

Furthermore, this invention is also supported by communication flexibility. According to the Shannon information theory, the channel capacity is determined by $$C = B\log\left(1 + \frac{S}{N}\right) \quad (1)$$

The increase in the signal power will increase the channel capacity. Since on the receiver side, sufficient power is available, it is no problem to transmit model and animation data to the transmitter.

In the case where the transmitter has certain computational ability and the latency is low, a second configuration scheme can be employed, which is illustrated in FIG. 4. In this scheme two analysis blocks are employed. These two analysis blocks are either {\sf hierarchical}, e.g., the image analysis part in the receiver performs rough estimation of animation and model data while the one in the transmitter refines the results obtained from the receiver, or {\sf separate}, e.g., the image analysis part in the transmitter is in charge of tracking while the one in the receiver is in charge of initial estimation.

DESCRIPTION OF THE PREFERRED EMBODIMENTS

Figure 3:
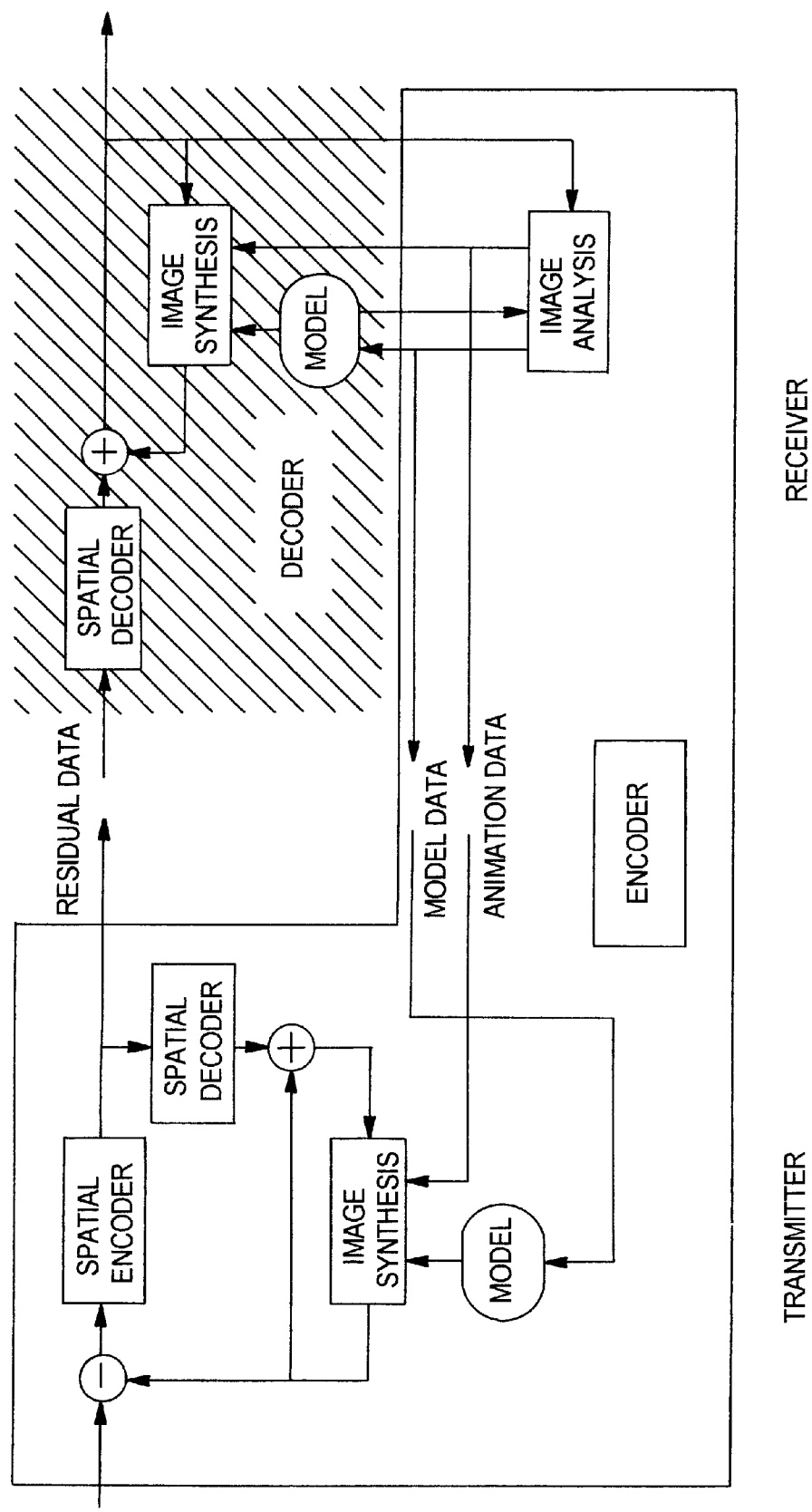
FIG. 3 illustrates an implementation scheme consistent with the present invention, wherein image analysis is performed at the receiver.

In the present invention, the receiver takes part in the coding processing. As shown in FIG. 3, the image analysis is performed in the receiver. In comparison with the prior art, the input to the image analysis block is no longer the current frame but the previous frame. Therefore, a key issue for image analysis is its ability to predict the normal parameters of the current frame. Assume that previously decoded frames, $I^*_{t-1}$ and $I^*_{t-2}$ are available at the receiver side and the frame $I^*_{t-1}$ is also available at the transmitter side. Now the task is to transmit the current frame $I^*_t$.

Image analysis is performed by using the previously decoded frames $I^*_{t-1}$ and $I^*_{t-2}$ based on the model $V^*_{t-1}$ in the receiving side:

$$[\tilde{A}_t, \tilde{A}_t]^T = \text{analysis}(I^*_{t-1}, I^*_{t-2}, V_{t-1}) \quad (2)$$

where $\tilde{A}_1$ are the animation data and $\tilde{M}_1$ are the model data which will be used to update the employed model. The obtained animation data and model data are compressed and then transmitted back to the transmitter.

At both the transmitter and receiver the employed model is updated by the model data $$\tilde{V}_t = \text{model\_update}(V_{t-1}, \tilde{M}_t) \quad (3)$$

Here we distinguish two cases:
Case I: No Refinement $$A_t = \tilde{A}_t$$

$$M_t = \tilde{M}_t$$

$$V_t = \tilde{V}_t \quad (4)$$

Case II: Refinement
A new image analysis taking the current frame as input is performed to refine the results estimated from previously decoded frames $$[A_t, M_t]^T = \text{analysis\_refine}(I_t, I^*_{t-1}, \tilde{A}_t, \tilde{M}_t, \tilde{V}_t) \quad (5)$$

and the employed model is also refined $$V_t = \text{model\_refine}(\tilde{V}_t, M_t) \quad (6)$$

At the transmitter, the prediction of the current frame can be rendered by an image synthesis operation based on the updated model $V_t$, $$I'_t = \text{render}(A_t, V_t, I^*_{t-1}) \quad (7)$$

The texture residual signal is $$\delta I_t = I_t - I'_t \quad (8)$$

The residual information will be compressed by applying spatial coding methods, e.g. DCT on the residual signal.

$$R_t = \text{DCT}(\delta I_t) \quad (9)$$

Note that in Case II the animation and model residual signals $\delta A_t$, and $\delta M_t$ also need to be compressed and transmitted to the receiver. These two residual signals are defined as $$\delta A_t = A_t - \tilde{A}_t \quad (10)$$

and $$\delta M_t = M_t - \tilde{M}_t \quad (11)$$

Figure 1:
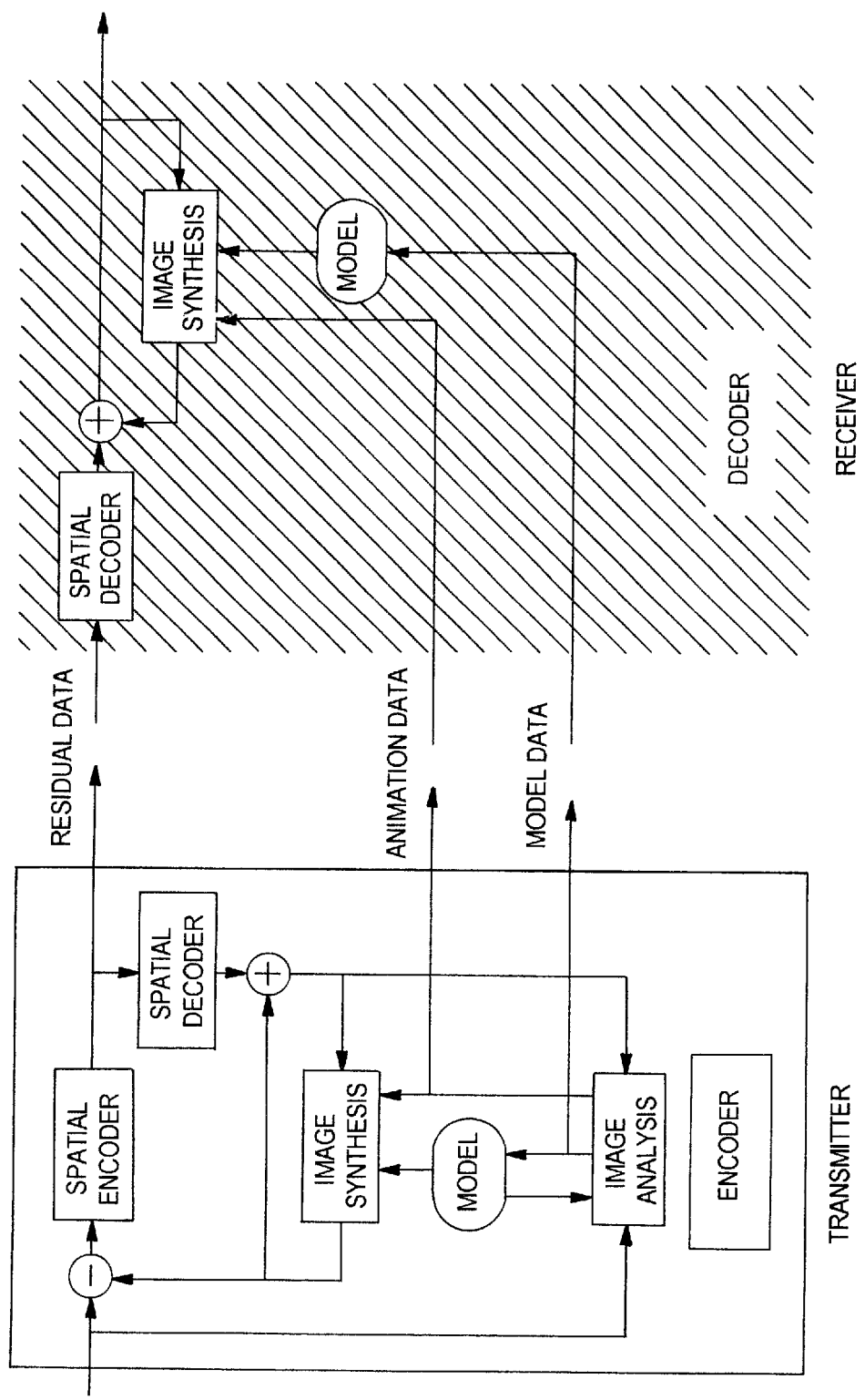
FIG. 1 illustrates a prior art unified video compression structure.
Figure 2:
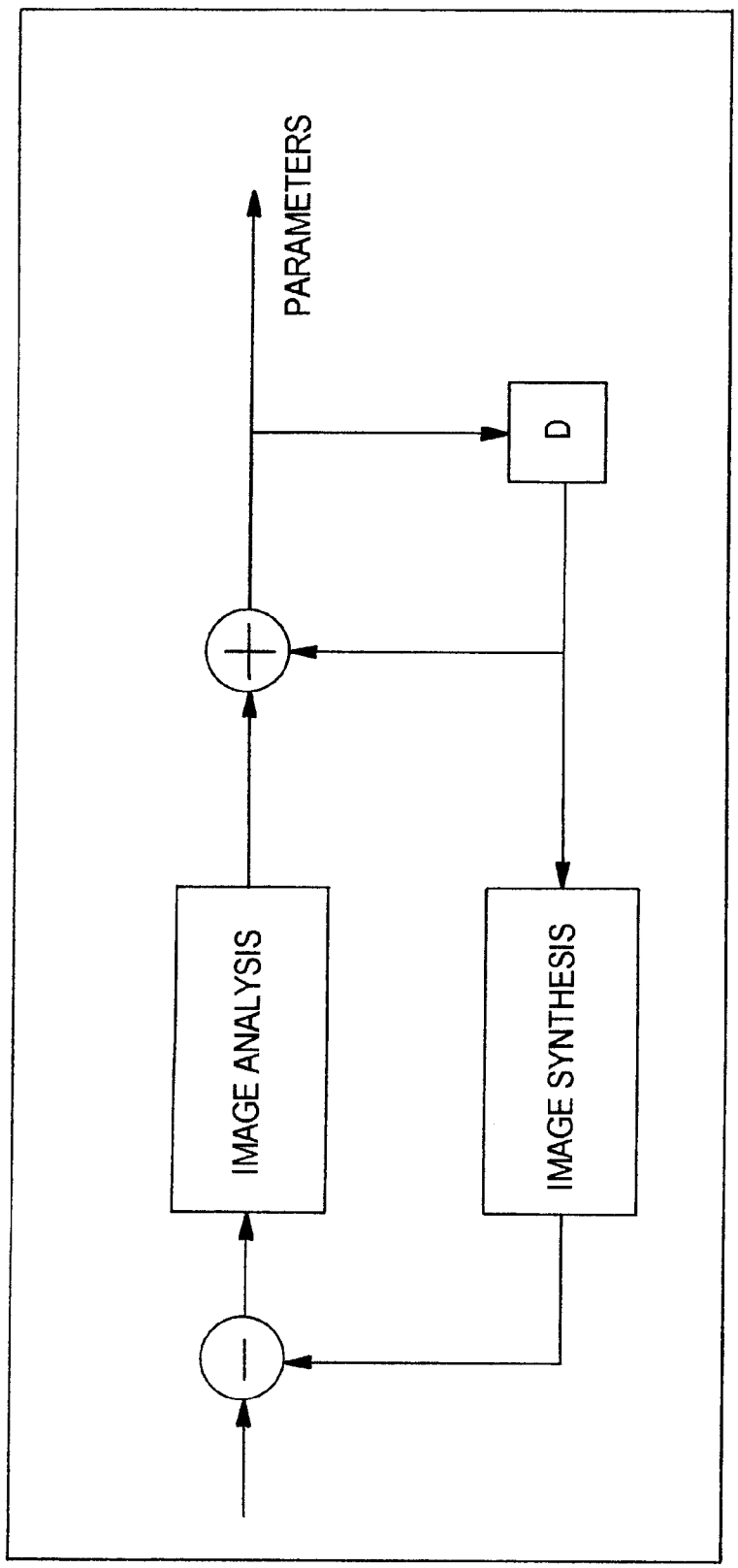
FIG. 2 illustrates a prior art image analysis based on the analysis by synthesis (ABS) principle.

Specified Techniques
Motion Prediction Technique for Two-way Mobile Communication In two-way mobile communication, one of the main problems is that the available channel capacity is very limited, e.g. 9.6 kb/s for GSM standard. To transmit video through the mobile channel, advanced video coding algorithms such as H.263, a video coding algorithm standardized by ITU, must be employed. As shown in FIG. 1, H.263 is a block-based video compression algorithm in which the image analysis corresponds to block-based motion estimation and image synthesis corresponds to block based motion compensation. There is no information about modeling.

The main problem with this type of configuration is that the limited power available in the mobile terminals prohibits complicated signal processing operations, e.g. motion estimation. In addition, both the transmitter and receiver have low power. Fortunately, there is no direct communication necessary between these low power terminals, since two-way communication is carried out through base stations where sufficient power is available.

Figure 4:
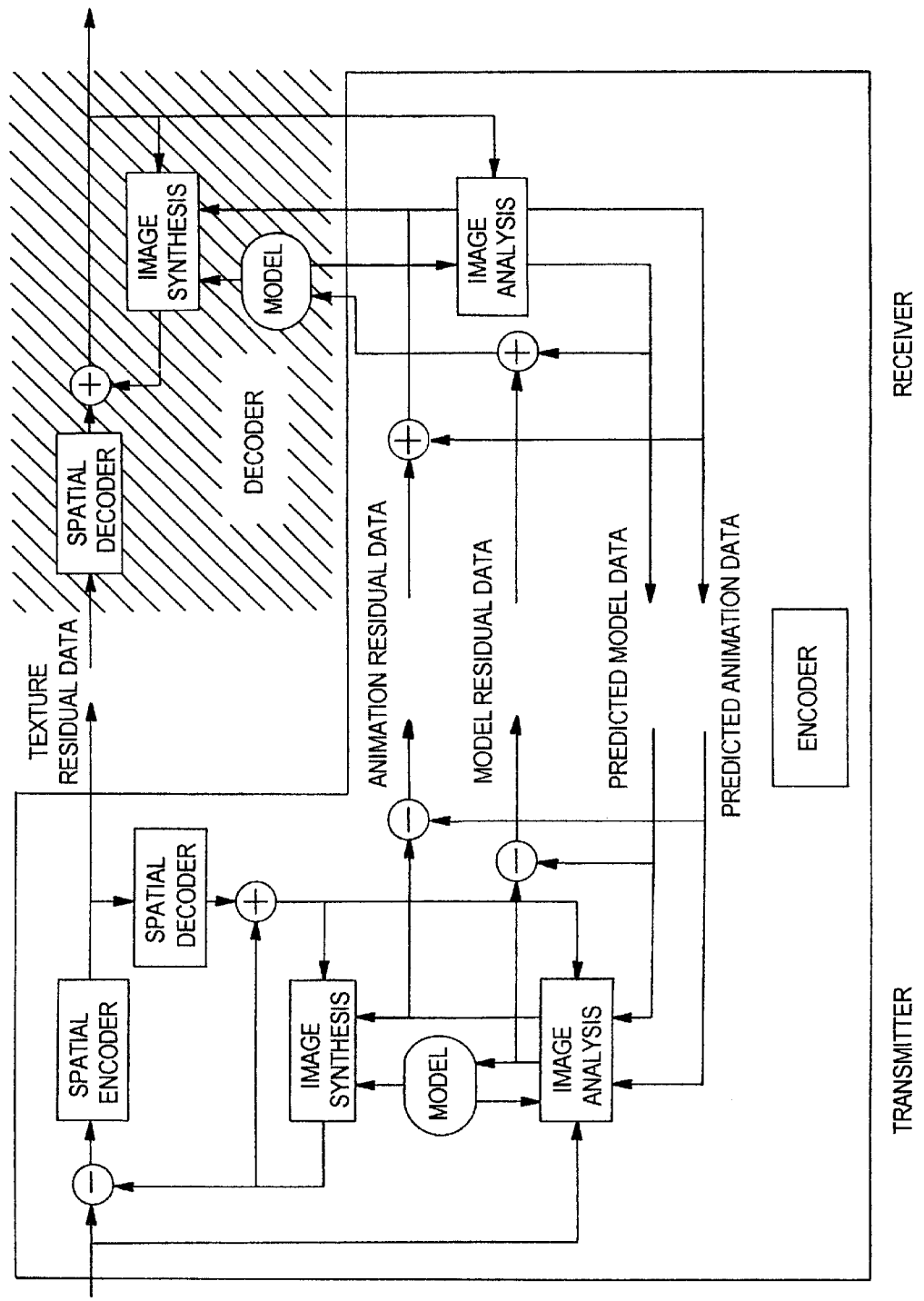
FIG. 4 illustrates an alternative implementation scheme, wherein image analysis is performed at both the transmitter and the receiver.

A practical solution is to move the motion estimation part from the transmitter to the base station as shown in FIG. 4. Here, the encoder virtually sits across from the transmitting terminal and the base station. Now the task of image analysis is to estimate animation data in the base station. Since block-based algorithm is employed, the animation data contains motion information only.

Assume that previously decoded frames, $I^*_{t-1}$, $I^*_{t-2}$, are available at the base station and the frame $I^*_{t-1}$ is also available at the transmitter and the receiver. To make a prediction of the current frame, motion vectors for the current frame must be provided. This is done in the base station where motion prediction has to be made.

$$\tilde{A}_t = \text{analysis}(I^*_{t-1}, I^*_{t-2}) \qquad (12)$$

The obtained motion information $\tilde{A}_t$ is then transmitted to both the transmitter and the receiver.

With the obtained motion vectors $\tilde{A}_t$, the motion vectors to be used can be obtained by either $A_t = \tilde{A}_t$ or $A_t = \text{analysis\_refine}(I_t, I^*_{t-1}, \tilde{A}_t)$ depending on which schemes are used. Thus, a motion compensated prediction of the current frame is given by $$I'_t = \text{render}(A_t, I^*_{t-1}) \qquad (13)$$

Obviously, the key to this technique lies in the performance of motion prediction (12).

Now, we present a new technique for performing motion prediction by employing a new search strategy which makes use of existing search methods, e.g. a block-matching algorithm to achieve motion prediction.

Assuming that a block-matching scheme is employed to predict the current frame $I_t$ using the previous $I^*_{t-1}$, the current frame must be segmented into rectangular blocks first and then one displacement vector $(u^*, v^*)$ is to be estimated per block through $$\min_{u,v} \sum_{(n_1,n_2) \in R} |I_t(n_1, n_2) - I^*_{t-1}(n_1 - u, n_2 - v)|^2 \qquad (14)$$

where R is a rectangular block centered on $(n_1, n_2)$.

Since $I_t$ is not available in the base station, the motion vector $(u^*, v^*)$ cannot be recovered at time t from the constraint (14). To achieve motion prediction, the interframe motion is assumed to follow a physical motion model. Under this assumption, we have $$I_t(n_1,n_2) \approx I^*_{t-1}(n_1 - u^*, n_2 - v^*) \approx I^*_{t-2}(n_1 - au^*, n_2 - bv^*) \qquad (15)$$

where a and b are constants which are specified by the assumed motion model. When a uniform motion is assumed, a=2 and b=2.

Now the constraint (14) can be rewritten as $$\min_{u,v} \sum_{(n_1,n_2) \in R} |I^*_{t-2}(n_1 - au, n_2 - bv) - I^*_{t-1}(n_1 - u, n_2 - v)|^2 \qquad (16)$$

The motion vector $u^*, v^*$ are the animation data $\tilde{A}_t$, specified in equation (12). If no refinement is performed, then $u = u^*$ and $v = v^*$. Now the motion compensated prediction of the current frame can be given $$I'_t(n_1,n_2) = \text{render}(A_t, I^*_{t-1}(n_1, n_2)) = I^*_{t-1}(n_1 - u, n_2 - v) \qquad (17)$$

If a refinement operation is performed, a similar result can be obtained.

3D Motion Prediction Technique for Object-Oriented Video Coding Applications

In object-oriented video coding schemes, an important image analysis task is to estimate the 3D motion of the objects appearing in the scene. For example, in videophone and video conference scenes, a typical object is the human head. The task there is to extract two types of information: face definition parameters and face animation parameters. They correspond to model data and animation data defined in this invention. Advanced computer vision techniques are usually used to extract these data. As is known, these algorithms are computationally intensive, which usually cannot be handled by low power terminals. Our invention addresses this problem by moving the image analysis part to the receiver as illustrated in FIG. 3. The core of this technique is to employ Kalman filtering to predict 3D motion of objects appearing in the current frame.

Assume the 3D motion of objects can be modeled as a dynamic process $$A_{t+1} = f(A_t) + \xi \qquad (18)$$

where the function $f$ models the dynamic evolution of the state vector $A_t$ at time t. The measurement process is $$Y_t = h(A_t) + \eta \qquad (19)$$

where the sensor observations Y are a function h of the state vectors and time. Both $\zeta$ and $\eta$ are white noise processes having known spectral density matrices.

In the specific applications, the state vector $A_t$ consists of the motion parameters to the estimated and the observation vector $Y_t$ contains the available measurements, like pixel-based, feature-based measurements. The function $f$ may be a discrete-time Newtonian physical model of 3D motion.

Using Kalman filtering, we can obtain the optimal linear estimate $\tilde{A}_t$ of the state vector $A_t$ $$\tilde{A}_t = A^*_t + K_t(Y_t - h(A_t)) \qquad (20)$$

where $A^*_t$ is the prediction of the state Vector $A_t$.

The prediction of the state vector $A_{t+1}$ at the next time step is $$A^*_{t+1} = f(\tilde{A}_t) \qquad (21)$$

if the measurement $Y_1$ at time t is available.

Since the image analysis part is moved to the receiver, what is available there is the measurement $Y_{t-1}$. Therefore, we can only obtain the optimal linear estimate $\tilde{A}_{t-1}$ of the state vector $A_{t-1}$ $$\tilde{A}_{t-1} = A^*_{t-1} + K_{t-1}(Y_{t-1} - h(A_{t-1})) \qquad (22)$$

With it the prediction of motion parameters of the current frame is obtained $$A^*_t = f(\tilde{A}_{t-1}) \qquad (23)$$

The predicted motion parameters $A^*_t$ are sent to the transmitter. The transmitter synthesizes a prediction image $I'_t$ of the current frame, then the residual signal between the prediction and current frame is compressed and transmitted to the receiver. The receiver reconstructs the current frame with the received residual signal. Then the current measurement $Y_t$ can be extracted. With $Y_t$, the prediction of the next frame can be derived by using (20)(21).

This technique can be used for three cases:

Case I: If the terminal has weak computational ability and the connection from the receiver to terminal is of short delay, the predicted motion parameters are used in the terminal and only texture residual signal is transmitted to the receiver.

Case II: If the terminal has certain computational ability and the connection from the receiver to the terminal is of low delay, the predicted motion parameters will be refined by using the current frame. The refined motion parameters are used to predict the current frame. The texture residual signal is transmitted to the receiver. Additional residual signals between the refined motion parameters and predicted ones are also transmitted to the receiver.

Case III: If the connection from the receiver to the terminal is of long (or irregular) delay, no information is sent from the transmitter to the receiver for a while. The predicted motion parameters are used to drive animation at the receiver.

What is claimed is:

1. A method for the transferring of moving pictures from a sending station to a receiving station, said method comprising:

obtaining, at said receiving station, a predicted picture frame through at least one motion compensation technique;

comparing, at said receiving station, said predicted picture frame with the actual picture frame corresponding thereto;

generating, at said receiving station, a deviation signal corresponding to the difference between the actual and the predicted frames;

transmitting said deviation signal to said sending station; and respectively updating a data model contained in each of said sending and receiving stations, based on said deviation signal.

2. A method according to claim 1 wherein said sending unit is a mobile or landline telephone.

3. A method according to claim 1, wherein the steps of said method are repeated at substantially regular intervals for all or a part of a moving picture.

4. A method for the transferring of moving pictures from a sending station to a receiving station, said method comprising:

obtaining, outside said sending station, a predicted picture frame through at least one motion compensation technique;

comparing, outside said sending station, said predicted picture frame with the actual picture frame corresponding thereto;

generating, outside said sending station, a deviation signal corresponding to the difference between the actual and the predicted frames;

transmitting said deviation signal to said sending station and said receiving station; and respectively updating a data model contained in each of said sending and receiving stations, based on said deviation signal.

5. A method according to claim 4, wherein at least one of said obtaining, comparing, and generating steps is performed by a central base station; wherein information flow from the sending station to said central base station is smaller than or equal to that from said central base station to the sending station.

6. A method according to claim 4, wherein the steps of said method are repeated at substantially regular intervals for all or a part of a moving picture.

7. A communication network for the transfer of moving pictures, said network comprising:

a sending station;

a receiving station; and at least one base station adapted to obtain a predicted picture frame through at least one motion compensation technique, compare said predicted picture frame with the actual picture frame corresponding thereto, generate a deviation signal corresponding to the difference between the actual and the predicted frames, and transmit said deviation signal to said sending station and said receiving station;

wherein said sending and receiving stations are each adapted to update respectively a data module contained in said stations, based on said deviation signal.

8. A network as claimed in claim 7, further comprising a compensating prediction unit.

* * * * *